March 26, 1963 — R. E. NILSON — 3,082,638
TRANSMISSION GEAR SHIFT ASSEMBLY
Filed Dec. 4, 1961 — 5 Sheets-Sheet 2

INVENTOR.
ROBERT E. NILSON
BY
ATTORNEYS

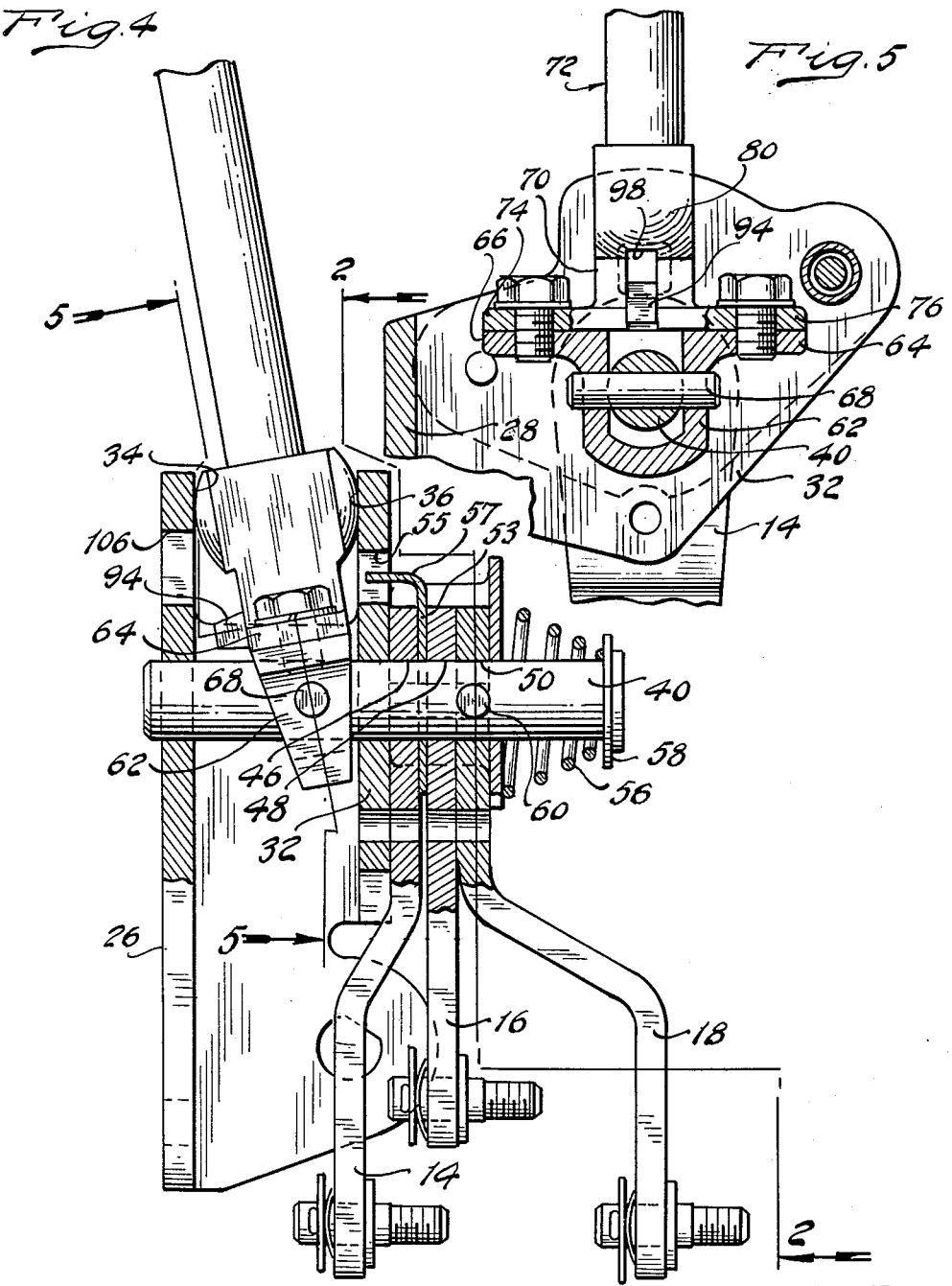

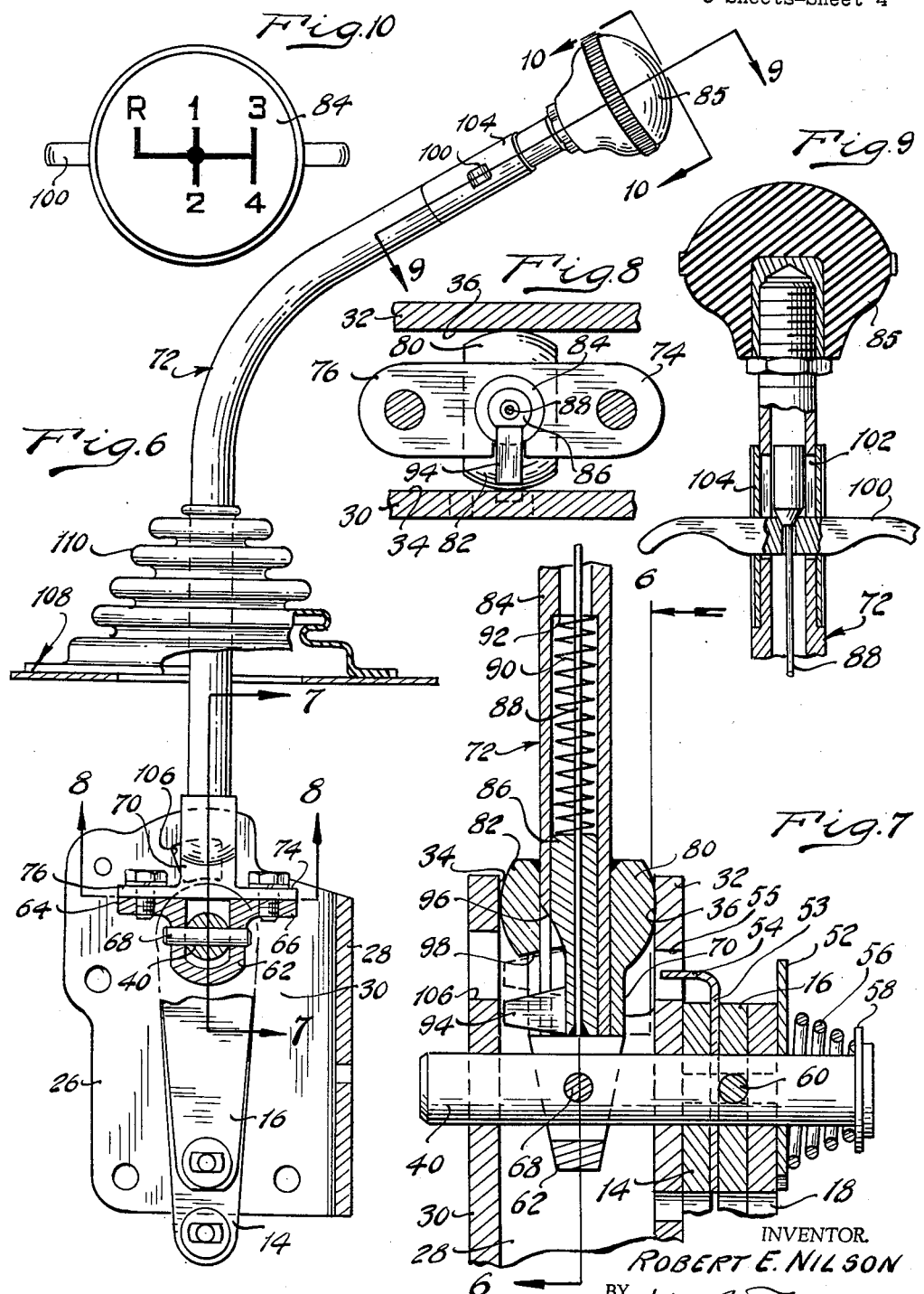

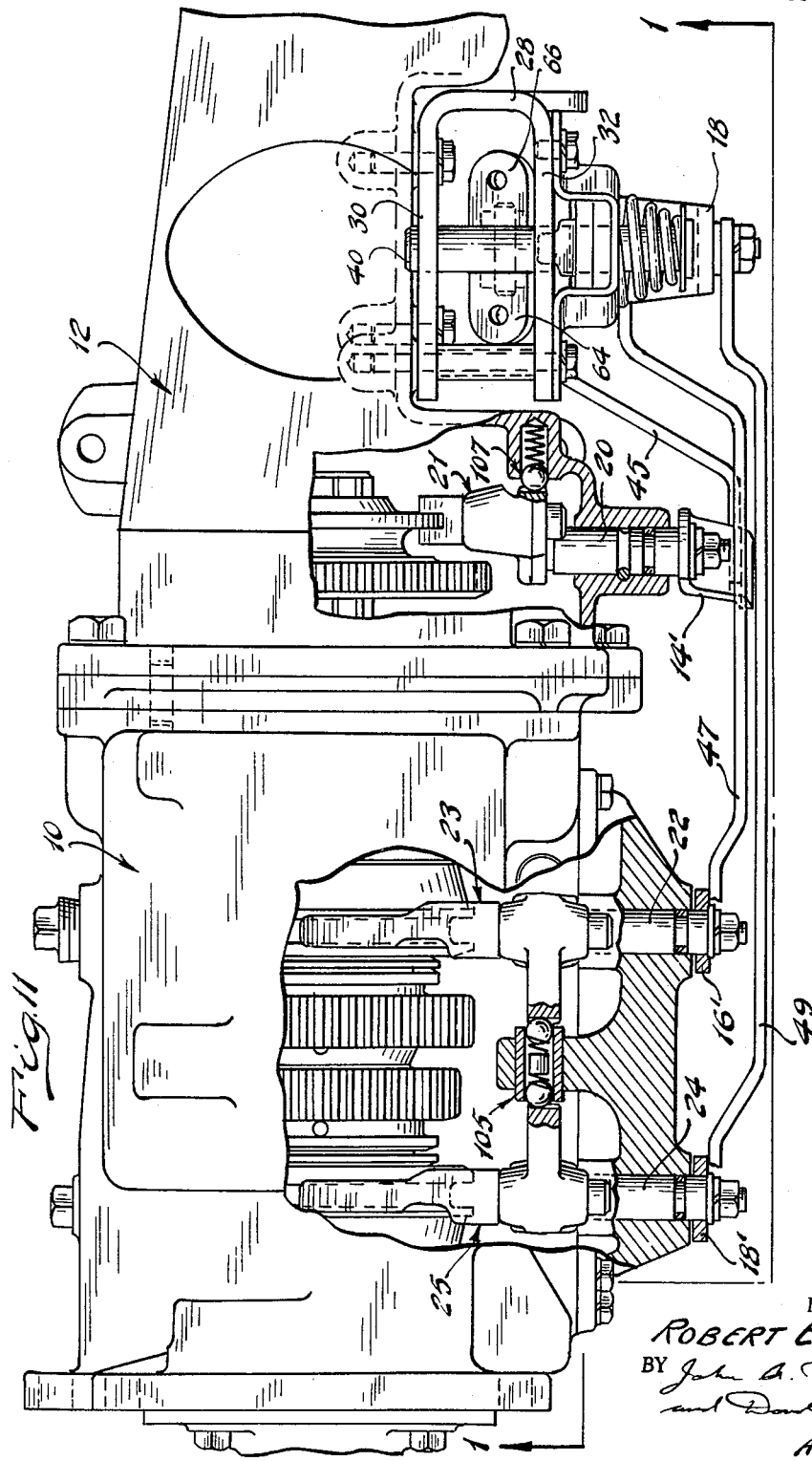

United States Patent Office 3,082,638
Patented Mar. 26, 1963

3,082,638
TRANSMISSION GEAR SHIFT ASSEMBLY
Robert E. Nilson, Livonia, Mich., assignor to Ford Motor Company, Dearborn, Mich., a corporation of Delaware
Filed Dec. 4, 1961, Ser. No. 156,837
6 Claims. (Cl. 74—473)

My invention relates generally to remote control mechanisms and more particularly to a personally operable mechanical linkage capable of establishing compound motion of a control member.

My invention is adapted particularly to be used to condition multiple speed ratio power transmission mechanisms for operation in any one of several speed ratios. The operating embodiment of my invention described herein is capable of selectively conditioning an automotive power transmission mechanism for operation in any one of four forward drive speed ratios or a reverse drive speed ratio, although my invention may be used also in a control linkage for a transmission having a fewer number of ratios.

The ratios are obtained by adjusting appropriately shift control levers that are mounted externally on the housing for the transmission mechanism.

The improvement of my invention comprises a personally operable control shaft that is joined pivotally at one terminal portion thereof to a selector shaft. An intermediate portion of the shift lever is formed with a crowned enlargement capable of transferring a force reaction to bracket structure carried by the transmission housing. Provision thus is made for adjusting the selector shaft axially and angularly with respect to its axis. Shift levers can be engaged selectively by the selector shaft thus establishing a releasable positive connection between any one of the levers and the selector shaft depending upon the position of the control shaft. The control levers can be mounted for rotation about an axis that is common to the axis of the selector shaft. One end of each control lever can be connected mechanically to an appropriate gear shifting linkage in the transmission mechanism.

The provision of a mechanism of the type above set forth being a principal object of my invention, it is a further object of my invention to provide a simplified gear selecting mechanism for a multiple speed power transmission that is characterized by substantially troublefree performance and ease in operation.

It is a further object of my invention to provide a gear shift mechanism of the type above set forth that can be used interchangeably with a variety of transmissions.

Further objects and advantages of my improvement will become apparent from the following description and from the accompanying drawings, wherein:

FIGURE 4 is a side elevation view, partly in section, of the structure of FIGURES 2 and 3. The portion shown in section is taken along section line 4—4 of FIGURE 2;

FIGURE 5 is a partial cross sectional view taken along section line 5—5 of FIGURE 4. FIGURE 5 shows a manually engageable portion of the gear shift mechanism;

FIGURE 6 is a partial cross sectional view taken along section line 6—6 of FIGURE 7;

FIGURE 7 is a view of the structure of FIGURE 6 as viewed along the plane of section line 7—7 of FIGURE 6;

FIGURE 8 is a traverse sectional view taken along section line 8—8 of FIGURE 6;

FIGURE 9 is a partial cross sectional view of the upper portion of the structure of FIGURE 6 and is taken along section line 9—9 of FIGURE 6;

FIGURE 10 is a view taken along the plane of the section line 10—10 of FIGURE 6 showing the upper portion of the shift lever; and FIGURE 11 is an axial view, partly in section, showing the gear shift mechanism and the power transmitting gears of the transmission assembly.

Figure 1:
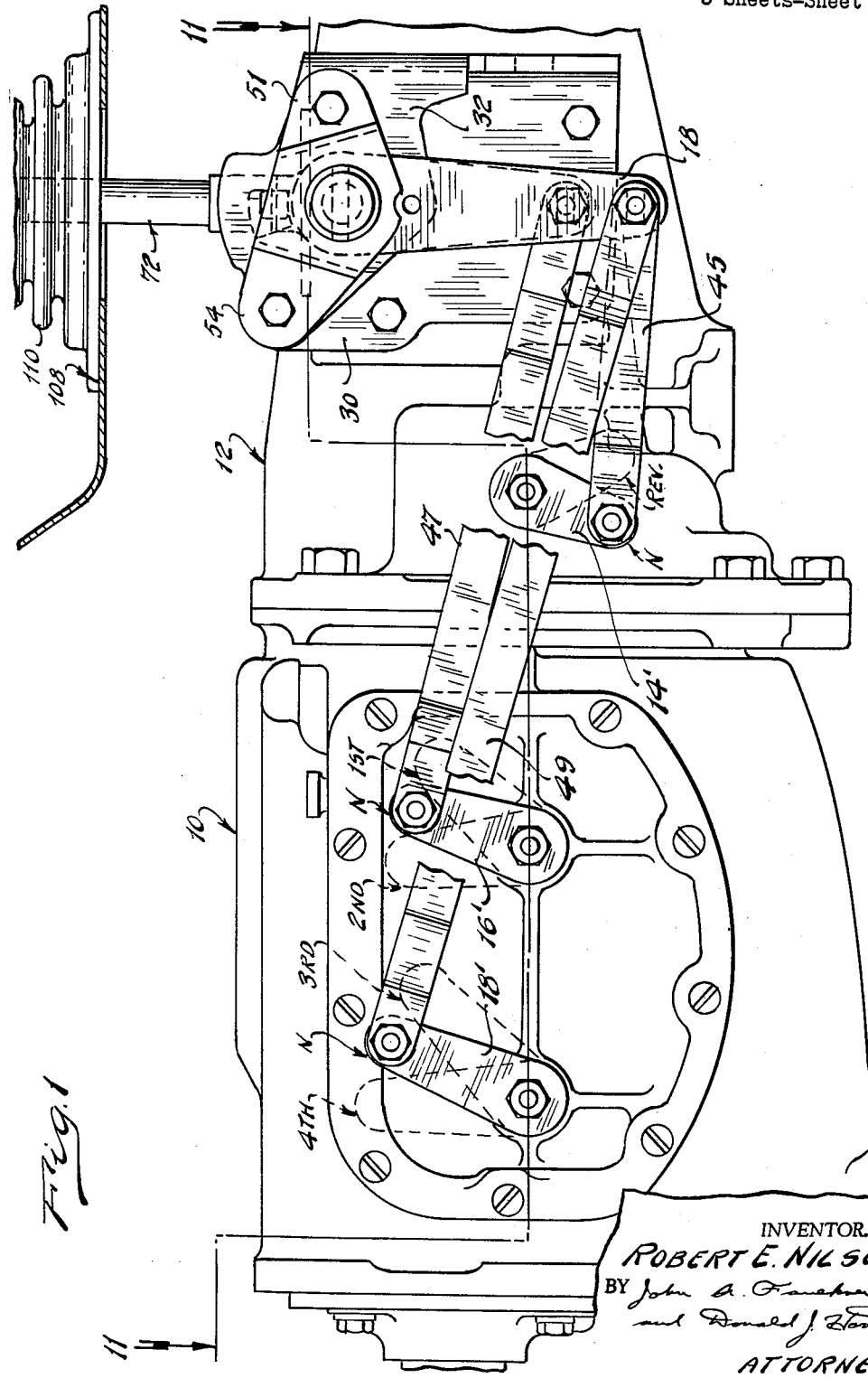
FIGURE 1 shows the exterior of a transmission housing for an automotive vehicle together with a portion of the gear shift linkage mechanism of my invention.
Figure 2:
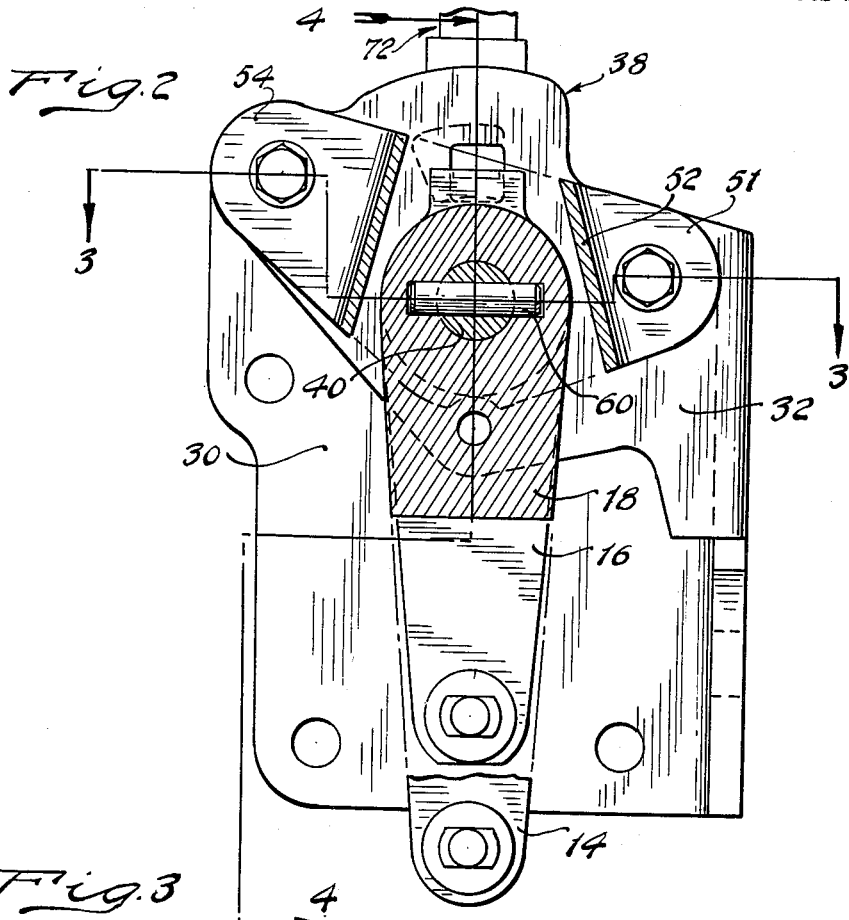
FIGURE 2 is a side elevation view, partly in section, of my improved gear shifting mechanism and is taken along section line 2—2 of FIGURE 4.
Figure 3:
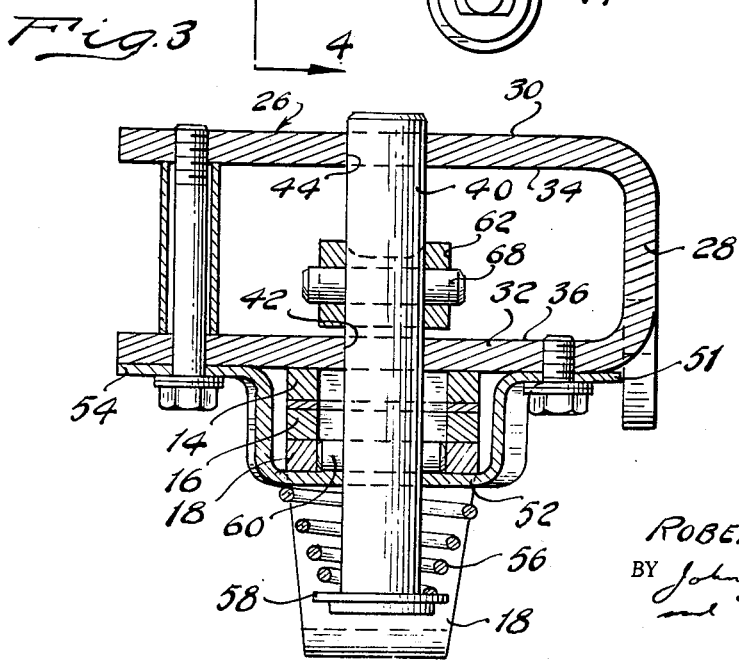
FIGURE 3 is a traverse sectional view of the structure of FIGURE 2 and is taken along section line 3—3 of FIGURE 2.

Refering first to FIGURES 1 and 11, numeral 10 designates generally a housing for an automotive transmission. It includes gear elements capable of establishing plural torque delivery paths between an engine driven shaft and a power output shaft. Numeral 12 designates an extension housing that is bolted or otherwise secured to housing 10. The power output shaft, sometimes referred to as the tailshaft, is housed within the housing 12.

Three control levers are shown in FIGURES 1 and 11 and are identified by reference characters 14', 16' and 18'. Lever 14' is carried by a rocker shaft 20 that supports a gear shifter mechanism 21 within the transmission housing 12 that is adapted to condition the transmission mechanism for reverse drive operation. Similarly, levers 16' and 18' are carried by rocker shafts 22 and 24, respectively. The shaft 22 carries within housing 10 a suitable gear shifting mechanism 23 that is adapted to condition the transmission for operation in the first or second speed ratios. Rocker shaft 24 is connected to a gear shifting mechanism 25 that is adapted to condition the transmission for operation in either the third or fourth speed ratios. The mechanism 25 also is situated within housing 10. When th lever 16' is rotated in a clockwise direction, as viewed in FIGURE 1, the transmission mechanism will be conditioned for first speed ratio operation. When it is rotated in the opposite direction, it is conditioned for second speed ratio operation. If it assumes a position intermediate these two positions, the associated gear mechanism assumes a neutral condition.

Control lever 18' also has two operating positions and an intermediate neutral position. When it is rotated in a clockwise direction, as viewed in FIGURE 1, and the lever 16' is in the neutral position, the transmission is conditioned for a third speed ratio operation. If the lever 18' is rotated in a counterclockwise direction, as viewed in FIGURE 1, while the lever 16' is in the neutral position, the transmission is conditioned for fourth speed ratio or direct drive operation.

The levers 16' and 18' must assume a neutral position when the lever 14' is moved to the reverse drive position. Conversely, lever 14' must assume a neutral position whenever one of the levers 16' or 18' assumes a torque delivery position.

The structural details of the gear shifting mechanism are shown more particularly in FIGURES 2 through 10. It includes a bracket 26 having a base portion 28 and two leg portions 30 and 32. The leg portions 30 and 32 define spaced parallel walls that are identified respectively by reference characters 34 and 36. As best observed in FIGURE 2, leg portions 30 and 32 are extended upwardly as indicated generally at 38.

A selector shaft 40 is received slidably within cooperating openings 42 and 44 formed in leg portions 32 and 30, respectively.

Shift levers 14, 16 and 18 are formed with openings 46, 48 and 50, respectively, and are mounted upon shaft 40 for oscillation about the axis of shaft 40. They are held against axial displacement relative to shaft 40 by means of a cover 52 having bolt flanges 51 and 54 to accommodate a bolted connection between cover 52 and the leg portion 36 of the bracket 26. These levers are connected to control levers 14', 16' and 18', respectively, by means of the linkage members shown in FIGURES 1 and 11 at 45, 47 and 49.

A spacer 53 is received over selector shaft 40 and is disposed between shift levers 14 and 16. Relative rotation of spacer 53 with respect to the housing 26 is prevented by a tab 57 received within a cooperating recess 55 formed in the leg portion 32 of the housing 26.

A compression spring 56 is seated upon a washer 58 carried by the end of selector shaft 40. Spring 56 acts against the cover 52 thereby normally urging the shaft 40 in a right-hand direction as viewed in FIGURE 4.

A selector pin 60 is carried by shaft 40 and is arranged transversely with respect to the axis of shaft 40. Each of the openings 46, 48 and 50 is provided with recesses or keyways arranged diametrically to receive the ends of pin 60 as it is carried during shifting movement of shaft 40. When the keyways for the respective levers 14, 16 and 18 are aligned, pin 60 can be moved throughout the entire extent of the spacing between cover 52 and the leg portion 32 of the housing 26. The keyways are aligned in this fashion when the levers 14, 16 and 18 assume their respective neutral positions.

When the shaft 40 is rotated about its axis with the pin 60 situated at the extreme right-hand position illustrated in FIGURE 4, lever 18 will be rotated about the axis of shaft 40 while the other two levers 14 and 16 remain stationary.

When the shaft 40 is moved to an intermediate position, the connection between shaft 14 is interrupted and a connection then is established between shaft 40 and lever 16. When the shaft then is rotated, shaft 16 will be oscillated to one or the other of its torque delivery positions depending upon the direction of rotation of shaft 40.

In a similar fashion, the pin 60 will establish a connection between shaft 40 and lever 14 when it is shifted to the extreme left-hand position as viewed in FIGURE 4. The connection between shaft 40 and levers 16 and 18 will be interrupted under these conditions.

Before the pin 60 can be adjusted from one operating position to another, the lever with which it is engaged under any given condition must first be moved to its neutral position. Thus, the lever 18 must be moved to its neutral position before the pin 60 can be shifted from the position shown in FIGURE 4 to the intermediate position. Similarly, the lever 16 must be moved to its neutral position before the pin 60 can be returned to the position shown in FIGURE 4. This same relationship exists between the lever 14 and each of the other levers 16 and 18. This prevents simultaneous completion of two torque delivery paths in the transmission mechanism.

The mechanism for accomplishing the shifting and rotary motion of shaft 40 is shown in FIGURES 4, 5, 6, 7 and 8.

A U-shaped bracket 62 is situated between the leg portions 30 and 32. It includes a central portion that is situated around the shaft 40. It includes also two flanges 64 and 66. A pin 68 is received through the central portion of the bracket 62 and through the shaft 40 to provide a fulcrum.

The flanges 64 and 66 provide a support for a pedestal 70 for a control shaft 72. Pedestal 70 comprises flanges 74 and 76 that may be situated in engagement with the flanges 66 and 64, respectively. Each of the four flanges may be formed with bolt holes, the holes in flanges 64 and 66 being threaded to receive mounting bolts. When the pedestal 70 is assembled in this fashion, support is provided for the shaft 72. Thus, the pin 68 forms a fulcrum for the entire shaft 72 and can be oscillated in either a clockwise direction or a counterclockwise direction as viewed in FIGURE 4.

The pedestal 70 includes a pair of crowned portions 80 and 82. These crowned portions are adapted to engage respectively the surfaces 36 and 34 of the leg portions 32 and 30.

The shaft 72 includes a portion 84 received within a bore formed in the crowned portions 80 and 82. At the upper end of the shaft 72 a manually engageable knob 85 is mounted. This can be engaged by the vehicle operator to establish a compound motion of the shaft 40 as previously described.

The shaft portion 84 is hollow and slidably receives therein a slide 86 to which is connected a flexible cable 88. A spring 90 is situated between a spring seat 92 and the slide 86 to urge normally the slide 86 toward the position shown in FIGURE 7. At the base of the slide 86 there is carried a tongue 94 that extends outwardly through a slot 96 formed in the shaft portion 84. It extends also through a slot 98 formed in the pedestal 70 so that it extends to the exterior of the pedestal.

The upper end of the cable 88 is connected to a trigger 100 that is positioned slidably in a slot 102 formed in the upper end of shaft 72. A slidable sleeve 104 can be provided if desired to cover the slot 102. It is adapted to slide along the shaft 84 when the trigger 100 is pulled by the fingers of the vehicle operator. The spring 90 normally urges the trigger 100 to the position shown in FIGURE 9. When the trigger 100 is pulled by the operator, the pressure of spring 90 is overcome and the tongue 94 is moved in an upward direction as viewed in FIGURE 7.

The gear shift pattern that is followed by the vehicle operator during shift sequences is illustrated in FIGURE 10. When the knob 84 is shifted in a left-hand direction as viewed in FIGURE 10 and then forward, the transmission is conditioned for reverse drive operation. The knob 84 is biased normally toward the right as viewed in FIGURE 10 and third or fourth speed ratio can be selected merely by moving the knob either forwardly or reversely. In order to condition the transmission for first or second speed ratio operation, the knob 84 must be moved to an intermediate position and then moved either forwardly or reversely.

As previously indicated, the crowned portions 80 and 82 engage the inner surfaces of the leg portions 32 and 30, respectively. It thus is possible for the operator to shift the shaft 40 to any one of the several positions previously described merely by moving the knob 84 from the extreme right-hand position to the extreme left-hand position or to the intermediate position illustrated in FIGURE 10.

An interlock is provided within the transmission housing 12 for preventing simultaneous movement of levers 16' and 18'. This is generally designated in FIGURE 11 by reference numeral 105. Thus, when one of these levers is shifted, the other cannot be actuated. A spring detent for reverse lever 14' is contained within housing 12, as shown at 107. The spacer 52 prevents a frictional connection between levers 14 and 16. Thus, the lever 16 will not tend to move when the lever 14 is actuated, or vice versa.

In FIGURE 6 the vehicle floor pan is illustrated generally by reference character 108. A rubber boot 110 can be provided about the base of the shaft 72 to cover the opening in the floor pan 108.

I contemplate that my gear shift construction can be used on vehicle drive line installations in which the transmission itself is located beneath the floor pan of the forward portion of the passenger compartment. If the transmission is located centrally with respect to the vehicle centerline, the shaft 72 can extend upwardly through the floor pan to a location that is convenient to the vehicle operator.

It will be observed that when the control shaft 72 is moved to the reverse drive position, the tongue 94 at the base of the pedestal 70 will tend to engage the surface 34 of the bracket leg portion 30. This normally would inhibit the operator from shifting the transmission to the reverse drive. In order to accomplish such a shift it is therefore necessary to pull the trigger 100 in an upward direction thus causing the tongue 94 to move upwardly as viewed in FIGURE 7. When this occurs the tongue 94 becomes aligned with an opening 106 formed in the bracket leg portion 30. When it is so aligned an interference no longer will exist between the bracket 26 and the tongue 94. Thus, the gear shift column 52 can be moved to the reverse position and the shaft 40 will then assume the extreme left-hand position when it is viewed from the plane of FIGURE 4. This locking mechanism for the reverse drive prevents an inadvertent movement of the control shaft to the reverse drive position and contributes to safety in operation.

Having thus described a preferred embodiment of my invention, what I claim and desire to secure by United States Letters Patent is:

1. A gear shift mechanism for a multiple speed power transmission comprising a bracket having spaced walls, a selector shaft slidably supported by said walls, a plurality of shift levers mounted upon said shaft, means for establishing selectively a mechanical connection between said shaft and each of said levers, and a control shaft pivotally connected at one end thereof to said shaft and extending between said walls, said control shaft including crowned portions at a location intermediate the ends thereof, said crowned portions being engageable with the inner surfaces of said walls to provide a fulcrum whereby said selector shaft can be reciprocated in the direction of its axis upon movement of said control shaft in one direction and whereby said selector shaft can be rotated about its axis upon movement of said control shaft in a second direction transverse to said one direction.

2. A gear shift mechanism for a multiple speed power transmission comprising a bracket having spaced parallel walls, aligned openings in said walls, a selector shaft slidably received in said openings, a plurality of shift levers journaled upon said selector shaft on the exterior of said bracket, means for establishing selectively a mechanical connection between said selector shaft and each of said levers, spring means for urging said selector shaft toward one axial position, and a gear shift control shaft pivotally connected at one end thereof to said selector shaft and extending between said walls, said control shaft including crowned portions situated between the ends thereof, said crowned portions being engageable with the inner surfaces of said walls to provide a fulcrum whereby said selector shaft can be reciprocated in the direction of its axis upon movement of said control shaft in one direction and whereby said selector shaft can be rotated about its axis in a second direction transverse to said one direction.

3. A gear shift mechanism for a multiple speed power transmission comprising a bracket having spaced parallel walls, aligned openings in said walls, a selector shaft slidably received in said openings, a plurality of shift levers journaled upon said selector shaft on the exterior of said bracket, spring means for urging said selector shaft toward one axial position, a gear shift control shaft pivotally connected at one end thereof to said shaft and extending between said walls, said control shaft including crowned portions situated between the ends thereof, said crowned portions being engageable with the inner surfaces of said walls to provide a fulcrum, and a selector pin carried by said selector shaft, each lever having a cooperating recess adapted to receive said pin upon movement of said selector shaft to a given axial position whereby said selector shaft can be reciprocated in the direction of its axis upon movement of said control shaft in one direction and whereby said selector shaft can be rotated about its axis in a second direction transverse to said one direction.

4. A gear shift mechanism for a multiple speed power transmission comprising a bracket having spaced parallel walls, aligned openings in said walls, a selector shaft slidably received in said openings, a plurality of shift levers journaled upon said selector shaft on the exterior of said bracket, a retainer bracket means carried by one of said walls for inhibiting shifting movement of said levers relative to said selector shaft while accommodating relative rotary movement therebetween, spring means for urging said selector shaft toward one axial position, a gear shift control shaft pivotally connected at one end thereof to said selector shaft and extending between said walls, said control shaft including crowned portions situated between the ends thereof, said crowned portions being engageable with the inner surfaces of said walls to provide a fulcrum, and a selector pin carried by said selector shaft, each lever having a cooperating recess adapted to receive said pin upon movement of said selector shaft to a given axial position whereby said selector shaft can be reciprocated in the direction of its axis upon movement of said control shaft in one direction and whereby said selector shaft can be rotated about its axis in a second direction transverse to said one direction.

5. A gear shift mechanism for a multiple speed power transmission comprising a bracket having spaced parallel walls, aligned openings in said walls, a selector shaft slidably received in said openings, a plurality of shift levers mounted rotatably upon said shaft, means for establishing selectively a mechanical connection between said selector shaft and each of said levers upon shifting movement of said selector shaft to a given axial position, bracket means mounted upon one of said walls for inhibiting shifting movement of said levers relative to said selector shaft, spring means for normally biasing said selector shaft toward one axial position, a gear shift control shaft pivotally connected at one end thereof to said selector shaft and extending between said walls, said control shaft including crowned portions located intermediate the ends thereof, said crowned portions being engageable with the inner surfaces of said walls to provide a fulcrum whereby the selector shaft can be reciprocated in the direction of its axis upon movement of said control shaft in one plane of movement and whereby said selector shaft can be rotated about its axis upon movement of said control shaft in a second plane of movement transverse to said one plane, and means normally preventing movement of said selector shaft to one of said given positions while permitting movement to the remaining of said positions, and personally operable means for rendering inoperative said last named means.

6. A gear shift mechanism for a multiple speed power transmission comprising a bracket having spaced parallel walls, aligned openings in said walls, a selector shaft slidably received in said openings, a plurality of shift levers mounted rotatably upon said shaft, means for establishing selectively a mechanical connection between said selector shaft and each of said levers upon shifting movement of said selector shaft to a given axial position, bracket means mounted upon one of said walls for inhibiting shifting movement of said levers relative to said selector shaft, spring means for normally biasing said selector shaft toward one axial position, a gear shift control shaft pivotally connected at one end thereof to said selector shaft and extending between said walls, said control shaft including crowned portions located intermediate the ends thereof, said crowned portions being engageable with the inner surfaces of said walls to provide a fulcrum whereby the selector shaft can be reciprocated in the direction of its axis upon movement of said control shaft in one plane of movement and whereby said selector shaft can be rotated about its axis upon movement of said control shaft in a second plane of movement transverse to said one plane, and a blocker slidably mounted within a portion of said control shaft and engaging one of said walls in one pivotal position of said control shaft to block further pivotal movement of said control shaft in one direction, said one wall having an aperture therein, and personally operable means to slide said blocker to a position in alignment with said aperture to permit subsequent pivotal movement of said shaft in said one direction.

References Cited in the file of this patent
UNITED STATES PATENTS

| | | |
|---|---|---|
| 1,498,380 | Johnson | June 17, 1924 |
| 1,862,098 | Sheldrick | June 7, 1932 |
| 2,922,315 | Primeau | Jan. 26, 1960 |